Patented June 21, 1927.

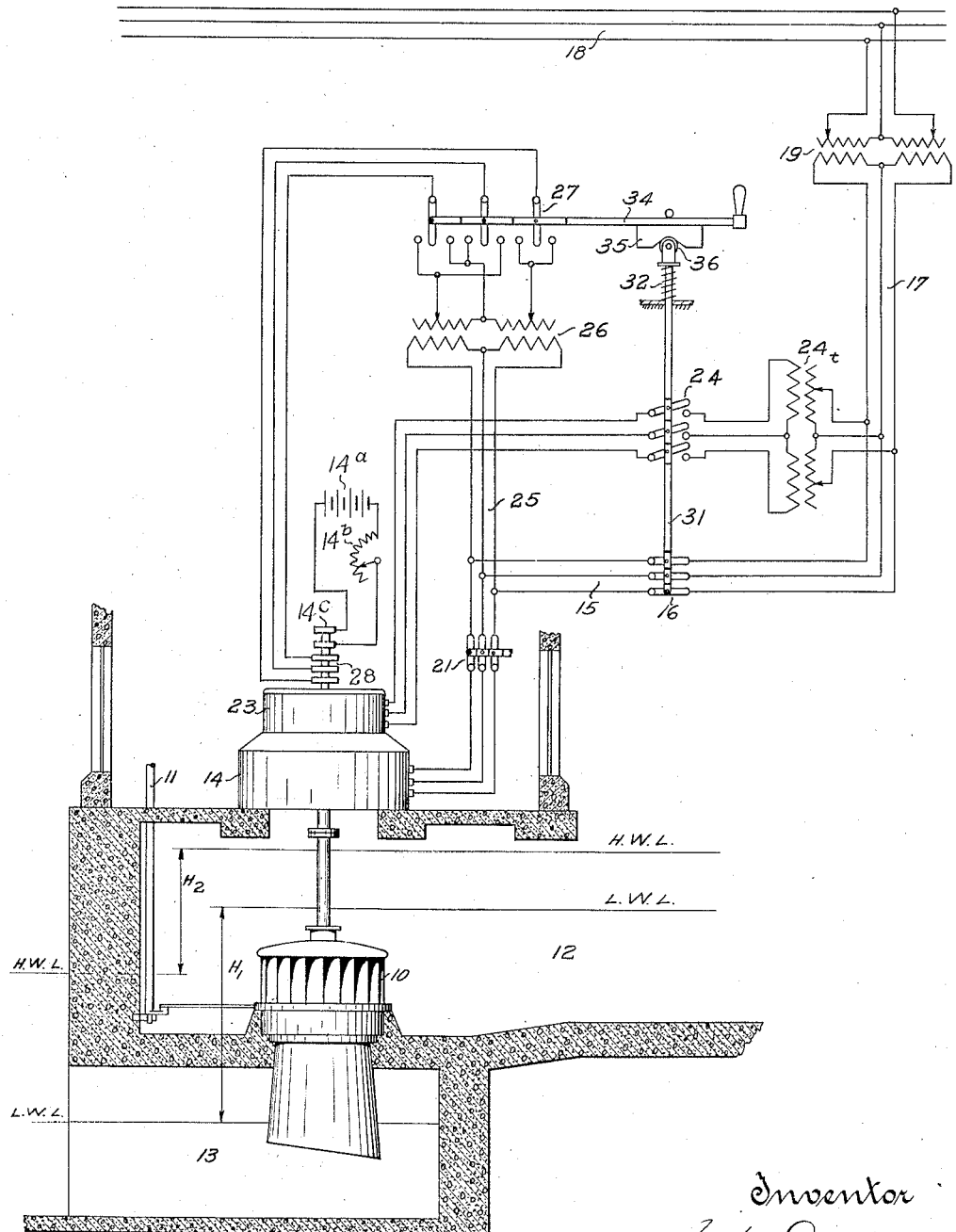

1,633,166

UNITED STATES PATENT OFFICE.

RAE W. DAVIS, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

POWER INSTALLATION.

Application filed April 3, 1922. Serial No. 548,905.

This invention relates in general to power installations, and it has particular relation to hydro-electric power installations where the hydraulic machine is operative under or against a widely varying head.

When a turbine is directly connected to an alternating current generator, it is desirable that the turbine should always operate at the same speed, so that the generator current may be always of the same frequency, for, otherwise, parallel operation with other generators would be impossible. If a constant load on the turbine be assumed, the speed thereof would tend to vary in the same sense as the supply of energy available at the inlet of the turbine.

In the case of the hydraulic turbine, this speed variation would be as the square root of the net head on the turbine. However, a hydraulic turbine operating at a speed which is 100 per cent, or nearly so, higher than normal, shows such unfavorable hydraulic efficiencies that this use becomes an uncommercial proposition; and the range of economic operating speeds is accordingly limited to some extent. The power developed by such a turbine is even more sensitively affected by a change in the net head: first, on account of the head itself, and second, on account of the discharge capacity. The capacity or power of the turbine, however, is also subjected to variation due to variation in the efficiency of the turbine, for the efficiency varies from its best value as the speed is greater or less than normal.

The present invention may include the use of an alternating current generating unit mechanically coupled to a hydraulic turbine subjected to widely varying heads, along with means for insuring that the current originally produced by the generator, may be supplied to the distribution line at a single, desired line frequency, to the final end that, independently of the head under which the turbine is operated, the frequency of the current supplied to the line circuit may remain constant at the desired value.

It is an object of this invention to provide a power installation of improved design wherein an alternating current dynamo-electric unit is operable at different normal speeds, and is connectible in efficient power relation to a distribution circuit whose frequency is definitely established by means independent of said dynamo-electric unit.

It is a further object of this invention to provide an improved form of hydro-electric installation comprising an alternating current generator unit driven by a hydraulic turbine normally subjected to a widely variable head, along with means for converting the electrical energy of the generator unit under certain conditions so as to produce current of a constant and desired frequency in the line circuit.

It is a further object of this invention to provide a hydro-electric installation of improved design and comprising an alternately current generator operable by a hydraulic turbine which is subjected to and operative under widely varying head, and a frequency converting device in the form of an asynchronous dynamo-electric machine connectible between the generator and the line circuit and effective to convert variable frequency current of the generator to constant frequency current supplied to the line circuit.

It is a further object of this invention to provide a hydro-electric installation of improved design comprising an alternating current generator mechanically connected to a hydraulic turbine which is subjected to and operative under widely varying head conditions, and a frequency converting machine likewise mechanically connected to said hydraulic turbine for operation thereby and effective to convert variable frequency current of the generator to constant frequency current supplied to the line circuit.

These and other objects and advantages are secured by the present invention, various novel features of which will appear from the description and drawings herein, disclosing an embodiment of the invention, and will be more particularly pointed out in the claims.

The single figure of the drawing discloses a partially sectional elevation of a hydro-electric installation, with a diagrammatic showing of certain of the electrical elements and operative connections therebetween.

In accordance with the disclosure of the drawings, a hydraulic turbine 10 is suitably mounted in a setting, and means such as a shaft 11 and associated parts, may be provided for controlling the guide vanes or other devices for varying the supply of water to the turbine inlet. As indicated, the turbine is located so that its inlet freely communicates with a forebay 12, and the discharge tube or draft tube of the turbine is operatively associated with a tailrace 13. A generator 14, of the alternating current type and preferably a synchronous machine, its D. C. field poles being mounted on the rotor of the machine and supplied from a D. C. source $14_a$, through a controlling rheostat $14_b$ and slip rings $14_c$, is suitably supported in position and its rotor is direct connected to the shaft of the hydraulic turbine, as indicated.

Electrical energy produced by the synchronous generator 14 finds its path through a circuit 15 and a switch 16, when the latter is in closed position, and the circuit 17 to the distribution line circuit 18. If desired, the connection between the circuit 17 and the line circuit 18 may be through a transformer 19, preferably of variable voltage ratio. As indicated, a switch 21 is preferably disposed in the circuit 15. A second generator unit, of the asynchronous type, has its rotor direct connected to the turbine and generator shaft and its stator mounted in position as by means of a support carried through the stator of the synchronous generator 14. This second generating unit 23 is of the induction type, that is, of the general form and construction of a wound rotor induction motor, in the present case, the rotor being preferably used as the primary element and the stator as the secondary of the motor. The secondary element or armature of the induction generator 23 is connected, through a switch 24 and, if desired, through a variable ratio voltage transformer $24_t$, to the circuit 17 which is in turn connected to the line circuit 18 through the transformer 19.

The circuit 15 of the synchronous generator 14 is connected through the circuit 25, and preferably through a variable voltage ratio transformer 26, and the reversible switch 27, to the slip rings 28 of the rotating primary element of the machine 23. When the switch 27 is actuated to its operative position at the left, the generator 14 is connected to the rotating element of the generator 23 so as to produce a rotating magnetic field therein which rotates in the same direction as this rotating element itself, so as to induce in the stationary secondary element of the machine 23 a current of a frequency equal to the sum of the frequency of the machine 14 and that of the machine 23. When the switch 27 is actuated to its operative position at the right the synchronous generator 14 is connected to the rotary primary element of the machine 23 so as to produce a rotating magnetic field whose direction of rotation is opposite to that of the rotating element itself, thus causing the production of an alternating current in the stationary armature of the machine 23 of a frequency equal to the difference between the frequencies of the machines 14 and 23.

The switches 16 and 24 are provided with a common operating rod 31 having resilient means associated therewith, as indicated at 32, for biasing the switch 16 to closed position and the switch 24 to open position; and the switch 27 is provided with an operating rod 34. This operating rod 34 is provided with a cam element 35 having a double cam surface cooperative with a head portion 36 on the operating rod 31 of the switches 16 and 24. With the switch operating means in its normal position, as indicated in the drawings, the switch 16 is closed, the switch 24 is open and the switch 27 is in its intermediate position. On actuation of the switch 27 to either of its operative positions, the switch 16 is moved to open position and the switch 24 to closed position through the cooperative connections between the cam element 25 and the head portion 36 of the operating rod 31, and against the effect of the biasing means 32. The arrangement of the switches and their operating devices is such that all of the switches remain in the operative positions to which they are actuated; and, hence, in either of the operative positions of the switch 27, the switch 16 remains open and the switch 24 remains closed.

The hydro-electric installation illustrated herein may be considered as being subjected to a head varying between a maximum head $H_1$ and a minimum head $H_2$. $H_a$ may be considered as the average head under which the turbine is operative. Under these circumstances, it may be preferable to select a design of turbine, which, when subjected to the average head $H_a$, will cause operation of the generator at a speed necessary to produce electrical energy of desired line frequency, say 60 cycles. Under conditions of normal design and operation of hydraulic turbines, fairly efficient operation of the turbine under conditions of constant speed and variable load may be maintained even though there is considerable variation in the head under which the turbine operates; and we can assume that the turbine may be controlled to maintain a constant speed, of say 300 R. P. M., and voltage, of say 4000 volts, under conditions of variable load, for a considerable variation in head both above and below the value $H_a$.

The normal speed of 300 R. P. M. and frequency of 60 cycles require that the generator 14 have 24 field poles. Under these circumstances, in order to obtain the desired constant frequency of the electrical output, the asynchronous generator 23 should be an 8-pole machine.

For the remainder of the range in head up to maximum head $H_1$, we can consider that $H_{1a}$ is an average value, and that a turbine speed of 450 R. P. M. can readily be maintained under conditions of variable turbine load and variable head within these limits.

We can assume further that the range in head between the lower limit in which the turbine is controlled to maintain the constant speed of 300 R. P. M., and the minimum head $H_2$, has an average value of head of $H_{2a}$. For operation of the turbine under heads within this lower range whose average value is $H_{2a}$, the turbine is regulated to maintain a speed of 225 R. P. M. under conditions of variable load on the turbine.

It is apparent that the total variation in head is divided into three ranges, the average head values being $H_a$ for the middle range, $H_{1a}$ for the upper range, and $H_{2a}$ for the lower range; and these ranges of head values are such as to produce definite turbine speeds of 300 R. P. M., 450 R. P. M., and 225 R. P. M., respectively. The speed of the turbine may be maintained constant at any one of these values, dependent upon the head at the time, and under conditions of varying load, through the use of suitable governing apparatus.

Assume that the turbine is operating under a head within the intermediate range whose average value is $H_a$. Under these conditions of operation, the governor is adjusted to maintain a turbine speed of 225 R. P. M. With the turbine operating at this intermediate speed, the switch 27 is in its intermediate or open position and the switch 16 is closed and the switch 24 open. Under these conditions, the generator 14 is connected directly to the distribution line circuit 17, and the electrical energy of the generator is delivered at 1000 volts and 60 cycles. While the variation in head is confined to the intermediate range, the speed of the turbine can readily be maintained by the governor at 300 R. P. M., and this in spite of variations in the load on the turbine.

Assume now that the head on the turbine has increased beyond the upper limit of the intermediate range. Under these conditions, the governor is adjusted to maintain a turbine speed of 450 R. P. M., under which conditions the generator produces electrical energy at a frequency of 90 cycles. However, in order that the electrical energy supplied to the line circuit 17 may still be 60 cycles, the operating rod 34 is shifted to the right so that the switch 27 connects the generator circuit 15, through the circuit 25, and the transformer 26, to the slip-rings of the 8-pole asynchronous machine 23. Operation of the rod 34 has caused the switch 16 to be actuated to open position and the switch 24 to closed position, through the cooperation of their operating rod 31 and the cam element 35 on the operating rod 34; and the stationary armature of the machine 23 is now connected to the distribution circuit 18 through the transformer $24_t$, the circuit 17 and the transformer 19.

With the connections just described, the synchronous generator delivers current of 90 cycles to the rotating element of the 8-pole asynchronous generator, and due to the fact that this 90 cycle current produces a magnetic field rotating in a direction opposed to the rotation of the element itself, 60 cycle current is induced in the stationary armature of the machine 23 and supplied therefrom to the line circuit. The voltage of this current can be controlled through regulation of the field of the synchronous generator 14 or through one or more of the transformers 19, $24_t$ or 26, so as to produce current of the required voltage, say 4000 volts, in the distribution circuit. The final result, in so far as the distribution circuit is concerned, is that 60 cycle current of the required voltage is still supplied to the line independently of the increase in speed of the turbo-generator unit.

Assume now that the head under which the turbine is operating has decreased to a value within the lower range whose average head is $H_{1a}$. Under these conditions, the governor is adjusted so as to maintain a turbine speed of 225 R. P. M. With the turbine operating at this speed, the synchronous generator 14 produces electrical energy at a frequency of 45 cycles. Under such conditions of operation, the operating rod 34 is shifted so as to move the switch 27 to its operative position at the left, wherein it connects the circuit of the generator 14 to the slip rings of the machine 23 so as to produce in the rotating element of the machine 23 a magnetic field rotating in the same direction as the element itself. When the switch 27 is moved to its new operative position, the switch 16 is moved to open position and the switch 24 moved to closed position, through cooperation of its operating rod 31 and the cam element 35 of the operating rod 34. With the connections as described herein, the synchronous generator 14 supplies electrical energy of 45 cycles to the rotating primary element of the 8-pole synchronous generator 23 and, consequently, 60 cycle current is induced in the stationary armature of the machine 23 and is supplied to the line circuit 18 through the switch 24, transformer $24_t$, circuit 17 and transformer 19. As described before, the voltage of the current supplied by the machine 23 may be regulated to produce the required line voltage, say 4000 volts, by regulation of the field of the synchronous machine 14, or regulation of any one or more of the transformers 26, $24_t$ and 19. The final result is that the line circuit is still supplied with 60 cycle energy of the proper voltage, even though there has been a decrease in the operating speed of the turbo-generator unit.

It will be apparent that various combinations of turbo-generator units involving synchronous and asynchronous generators may be provided, and the number of poles of the several machines will be suitably selected, to the end that the required amount of power at the required frequency may be produced in the most efficient manner possible, considering especially the quantity of water and average head available.

Likewise, it will be obvious that either or both of the generators 14 and 23 may be provided with means for producing different numbers of poles, to the end that the unit may be operated at additional speeds and still produce electrical energy of the required line frequency, that is, 60 cycles.

While the power unit described finds great utility when connected with a distribution circuit whose frequency is definitely established by means other than said power unit, nevertheless, it finds considerable utility when it is the only power unit connected to or establishing the frequency of the distribution circuit, for through the means described for maintaining a plurality of definite operating speeds for the generator, the unit is readily operative to furnish a supply of electrical power to such distribution circuit at the desired definite operating frequency.

While the simplest design of the system disclosed herein would probably include the shifting of the apparatus and the adjusting of the governor for the hydraulic machine by hand, as the head on the machine varies from one operating range to another, nevertheless, it is contemplated that this operation of providing for a change in the speed of the hydraulic machine, while insuring the supply of electrical energy of the desired constant frequency, may be wholly automatic in response to variations of the head under or against which the hydraulic machine is operating, that is, beyond predetermined limits corresponding to the limits of the three ranges of the head described above. An automatic device responsive to head, may be readily utilized for both adjusting the speed setting of the governor and for making the desired changes in circuit. Likewise, this head responsive device may be utilized for causing the above mentioned changes in the field excitation of the synchronous machine, and also the variation of the transformer voltage ratio, as the speed of the unit is caused to vary.

Again, this automatic control may be such as insures the automatic synchronizing of the unit with respect to the line circuit, incident to any change from one to another of the definite operating speeds.

The invention of the present application is related to that of applicant's copending application Serial No. 553,447, filed April 17, 1922, wherein certain features of the invention shown herein are claimed more broadly.

It should be understood that the invention claimed is not limited to the exact details of construction and arrangement shown and described herein, for obvious modifications will occur to one skilled in the art.

It is claimed and desired to secure by Letters Patent:

1. An electric power installation for the generation of alternating current of constant frequency under conditions of widely varying speed of prime mover, comprising an alternating current generator unit, a source of energy of variable available supply, a prime mover mechanically connected to said unit and operable from said source of energy to drive said unit at a plurality of different speeds dependent upon the supply of energy available, a distribution circuit, whose current the frequency of is definitely established by means other than said generator unit, and means operative to insure the supply of electrical energy from said generator unit to said distribution circuit independently of the particular one of said speeds at which said prime mover drives said generator unit, said means comprising a variable ratio frequency converter having a rotary alternating current element connected in driven relation to said prime mover.

2. An electric power installation for the generation of alternating current of constant frequency under conditions of widely varying supply of motive energy and consequent varying speed of prime mover, comprising an alternating current generator unit, a source of energy of variable available supply, a prime mover mechanically connected to said unit and operable from said source of energy to drive said unit at different speeds dependent upon the supply of energy available, a distribution circuit the frequency of whose current is definitely established by means other than said generator unit, and means comprising an asynchronous dynamo-electric machine driven by said prime mover for insuring the supply of energy from said generator unit to said distribution circuit when the frequency of the current of said generator unit is both above and below that of said distribution circuit.

3. An electric power installation for the generation of alternating current of constant frequency under conditions of widely varying supply of motive energy and consequent varying speed of prime mover, comprising an alternating current generator, a source of energy of variable available supply, a prime mover operable from said source of energy to drive said generator at different speeds dependent upon the supply of energy available, a distribution circuit the frequency of whose current is definitely established by means other than said generator unit, a frequency converter in the form of an asynchronous machine, and means for connecting said frequency converter between said generator and said distribution circuit to cause said frequency converter to interchangeably increase and decrease the frequency of the electrical energy supplied by said generator to the same value as the frequency of said distribution circuit.

4. An electric power installation for the generation of alternating current of constant frequency under conditions of widely varying speed of prime mover, comprising an alternating current generator, a source of energy of variable available supply, a prime mover mechanically connected to said generator and operable from said source of energy to drive said generator at different speeds dependent upon the supply of energy available, a distribution circuit carrying current whose frequency is definitely established by means other than said generator, an asynchronous dynamo-electric machine driven by said prime mover, and means for interconnecting said generator and said machine and for connecting said generator and said asynchronous machine to said distribution circuit to insure the supply of energy of the required definite frequency to said distribution circuit while said generator is operating at each of a plurality of normal operating speeds.

5. An electric power installation for the generation of alternating current of constant frequency under conditions of widely varying supply of motive energy and consequent varying speed of prime mover, comprising an alternating current generator, an asynchronous alternating current machine, a source of energy of variable available supply, a prime mover operable from said source of energy, said generator and said machine being connected in fixed driven relation to said prime mover and operable thereby at different speeds dependent upon the supply of energy available, a distribution circuit whose frequency is definitely established by means other than said generator, and circuit controlling devices operative to provide interchangeably direct connection between said generator and said distribution circuit, and direct connection between said asynchronous machine and said distribution circuit with a plurality of different connections between said generator and said asynchronous machine.

6. A hydro-electric installation for generation of alternating current of constant frequency under conditions of varying speed of prime mover, comprising an alternating current generator, a source of hydraulic power of variable available supply, a turbine operable from said source of hydraulic power to drive said generator at a plurality of different speeds dependent on the supply of hydraulic power available, a distribution circuit, and variable ratio frequency converter means for insuring the supply of electrical energy from said generator to said distribution circuit independently of the particular one of said speeds at which said turbine drives said generator, said means comprising an asynchronous machine connectible between said generator and said distribution circuit.

7. A hydro-electric installation for generation of alternating current of constant frequency under conditions of varying speed of prime mover, comprising an alternating current generator, a turbine mechanically connected in fixed driving relation to said generator and operable to drive said generator at a plurality of different speeds, a distribution circuit, and means for converting the energy produced by said generator to energy of the frequency of said distribution circuit independently of whether the frequency of the current of said generator is above or below that of said distribution circuit, said means comprising an asynchronous generator and means for insuring a constant speed of rotation of the magnetic field thereof independently of the operation of the rotating element of said asynchronous generator at a plurality of different speeds.

8. A hydro-electric installation for generation of alternating current of constant frequency under conditions of varying speed of prime mover, comprising an alternating current generator, a turbine operable to drive said generator at a plurality of different speeds, a distribution circuit, and variable ratio frequency converting means for insuring the supply of electrical energy from said generator to said distribution circuit independently of the particular one of said speeds at which said turbine drives said generator, said means comprising an asynchronous machine connectible between said generator and said distribution circuit, and means for connecting one element of said asynchronous machine to said generator in different phase relations.

9. A hydro-electric installation for the generation of alternating current of constant frequency under conditions of widely varying head and varying speed of prime mover consequent thereto, comprising a synchronous alternating current generator, and an asynchronous alternating current generator, a turbine operable to drive both of said generators at a plurality of speeds dependent upon the head under which said turbine is working, a constant frequency distribution circuit, and circuit controlling devices operative to provide interchangeably and alternatively a direct connection between said synchronous generator and said distribution circuit, connections between said asynchronous generator and both said synchronous generator and said distribution circuit, and means for reversing the phase of the current supplied by said synchronous generator to said asynchronous generator.

10. A hydro-electric installation for operation under conditions of widely varying head and varying speed of hydraulic machine incident thereto, comprising a hydraulic machine operable at different normal speeds, an alternating current dynamo-electric machine operatively connected to said hydraulic machine for operation therewith at said different normal speeds, a distribution circuit of definite frequency, and a frequency converting device comprising an asynchronous machine, and means for connecting said asynchronous machine between said distribution circuit and said first dynamo-electric machine to cause interchangeable increase and decrease of the frequency of the electrical energy transferred between said first dynamo-electric machine and said distribution circuit.

11. A hydro-electric installation for operation under conditions of widely varying head and variable speed, comprising a hydraulic machine operable at different normal speeds, an alternating current dynamo-electric unit comprising a synchronous machine and an asynchronous machine, both of said latter machines being operatively connected to said hydraulic machine for operation therewith at said different normal speeds, a distribution circuit of definite frequency, and instrumentalities for connecting said asynchronous machine between said synchronous machine and said distribution circuit to interchangeably increase and decrease the frequency of the electrical energy transferred between said distribution circuit and said synchronous machine with respect to the frequency of said distribution circuit.

12. A hydro-electric power installation for the generation of alternating current of constant frequency under conditions of widely varying available head on the turbine of the installation and varying speed of the turbine incident thereto, comprising a source of hydraulic power of variable available head, a hydraulic turbine operable by the energy of said source at a plurality of speeds dependent upon the available head, an alternating current dynamo-electric unit comprising an asynchronous alternating current machine operable by energy supplied from said turbine and at a speed dependent upon the speed of operation of said turbine, and means for insuring the production by said alternating current machine of current of a predetermined fixed frequency independently of the particular one of said speeds at which said turbine operates.

In testimony whereof, the signature of the inventor is affixed hereto.

RAE W. DAVIS.